United States Patent
Zhou et al.

(10) Patent No.: US 12,482,216 B2
(45) Date of Patent: Nov. 25, 2025

(54) EVENT CAMERA-BASED TIME-TO-COLLISION ESTIMATION METHOD, ELECTRONIC DEVICE AND STORAGE MEDIUM

(71) Applicant: HUNAN UNIVERSITY, Hunan (CN)

(72) Inventors: Yi Zhou, Hunan (CN); Kaizhen Sun, Hunan (CN); Jinghang Li, Hunan (CN); Bangyan Liao, Hunan (CN)

(73) Assignee: HUNAN UNIVERSITY, Changsha (CN)

( * ) Notice: Subject to any disclaimer, the term of this patent is extended or adjusted under 35 U.S.C. 154(b) by 0 days.

(21) Appl. No.: 18/764,571

(22) Filed: Jul. 5, 2024

(65) Prior Publication Data

US 2025/0191329 A1 Jun. 12, 2025

Related U.S. Application Data

(63) Continuation of application No. PCT/CN2024/070559, filed on Jan. 4, 2024.

(30) Foreign Application Priority Data

Dec. 12, 2023 (CN) .......................... 202311697075.5

(51) Int. Cl.
*G06V 10/26* (2022.01)
*G06T 7/20* (2017.01)
(Continued)

(52) U.S. Cl.
CPC .............. *G06V 10/273* (2022.01); *G06T 7/20* (2013.01); *G06V 20/58* (2022.01); *G07C 5/04* (2013.01);
(Continued)

(58) Field of Classification Search
CPC .. G06V 10/273; G06V 20/58; G06V 2201/07; G06V 2201/08; G06T 7/20;
(Continued)

(56) References Cited

U.S. PATENT DOCUMENTS

2015/0085119 A1 3/2015 Dagan et al.
2021/0142677 A1 5/2021 He
(Continued)

FOREIGN PATENT DOCUMENTS

| CN | 112349144 A | 2/2021 |
|---|---|---|
| CN | 113370977 A | 9/2021 |
| EP | 2835794 A1 | 2/2015 |

OTHER PUBLICATIONS

International Search Report of PCT/CN2024/070559, Apr. 3, 2024.

*Primary Examiner* — Dhaval V Patel
(74) *Attorney, Agent, or Firm* — Troutman Pepper Locke LLP; Tim Tingkang Xia, Esq.

(57) ABSTRACT

The present disclosure provides an event camera-based time-to-collision estimation method, an electronic device and a storage medium, which estimates the time-to-collision based on a stream of events acquired by an event camera, overcomes the problem of very large delays in the prior art, and improves the time-to-collision estimation accuracy rate and robustness in autonomous driving scenarios, while the feature of low energy consumption enables the method to be better adapted to embedded scenarios, reducing procurement and running costs, the TTC output frequency of the method of the embodiment can be up to 200 Hz, so the method has great application potential in real-time TTC tasks, and is more suitable for real-time TTC tasks with sudden change in relative speed.

9 Claims, 1 Drawing Sheet

(51) Int. Cl.
  *G06V 20/58* (2022.01)
  *G07C 5/04* (2006.01)
  *H04N 25/47* (2023.01)

(52) U.S. Cl.
  CPC ... *H04N 25/47* (2023.01); *G06T 2207/30261* (2013.01); *G06V 2201/07* (2022.01); *G06V 2201/08* (2022.01)

(58) Field of Classification Search
  CPC .............. G06T 2207/30261; G07C 5/04; H04N 25/47; Y02T 10/40; B60W 30/08
  See application file for complete search history.

(56) References Cited

U.S. PATENT DOCUMENTS

| | | | |
|---|---|---|---|
| 2023/0186486 A1* | 6/2023 | Zhang | G06V 10/469 382/103 |
| 2023/0289983 A1* | 9/2023 | Chumerin | G06T 7/248 |
| 2023/0386231 A1* | 11/2023 | Lee | G06V 10/95 |
| 2023/0415779 A1* | 12/2023 | Chien | G06V 20/64 |
| 2024/0362922 A1* | 10/2024 | Yang | G06V 10/82 |

\* cited by examiner

EVENT CAMERA-BASED TIME-TO-COLLISION ESTIMATION METHOD, ELECTRONIC DEVICE AND STORAGE MEDIUM

CROSS-REFERENCE TO RELATED PATENT APPLICATION

This application is a continuation application of International Application No. PCT/CN2024/070559, filed on Jan. 4, 2024, which itself claims priority to Chinese Patent Application No. 202311697075.5, filed on Dec. 12, 2023, the disclosures of which are hereby incorporated by reference.

TECHNICAL FIELD

The present disclosure belongs to the technical field of assisted driving in vehicles, and particularly relates to an event camera-based time-to-collision estimation method, an electronic device and a storage medium.

BACKGROUND OF THE INVENTION

As more and more vehicles are equipped with driving assistance systems, various driving assistance tasks are defined and implemented, such as lane following, pedestrian recognition, etc. In these tasks, the implementation of vehicle collision warning systems is very important and challenging.

There are a number of research cases where a monocular camera is used to acquire continuous images, and a Time-to-Collision (TTC) is estimated from the continuous images. Since the imaging size of the front vehicle varies in the presence of relative motion with the host vehicle, the TTC can be obtained by the variation of the imaging size. But this approach has the problem that the update rate of the TTC is limited to the frame rate of a standard camera, considering cost, bandwidth and energy consumption, standard cameras used in autonomous assisted driving systems typically run at around 10 Hz with an interval of around 100 ms between two consecutive exposures, which even without considering the calculation time of the applied TTC algorithm, is a very large delay for collision early warning systems, especially when the relative speed increases dramatically.

SUMMARY OF THE INVENTION

Based on this, an event camera-based time-to-collision estimation method, an electronic device and a storage medium are provided for the above technical problems.

The technical solutions adopted by the present disclosure are as follows:

As a first aspect of the present disclosure, there is provided event camera-based time-to-collision estimation method, including:

S101, acquiring a stream of events in real time by an event camera of a host vehicle, acquiring a front image in real time by a frame camera of the host vehicle, tracking a bounding box of a target front vehicle in real time, eliminating events located beyond the bounding box, determining a front vehicle event triggered by a contour point of the target front vehicle;

S102, extracting events within time $\Delta t$ from the front vehicle events as target events, the $\Delta t$ being the difference between a first moment and a second moment, the first moment representing a current moment and the second moment being earlier than the first moment;

S103, transforming normalized coordinates of a target contour point corresponding to each target event into normalized coordinates of a reference moment $t_{ref}$ by time-variant affine transformation through $\mathcal{A}(p_k; a)(t_{ref}-t_k)$, wherein, $$\mathcal{A}(p_k; a) = \frac{1}{Z(t_{ref})}\begin{bmatrix} -v_x + x(t_k)v_z \\ -v_y + y(t_k)v_z \end{bmatrix},$$

$p_k$ represents the normalized coordinates of the target contour point, $$a \doteq \frac{v}{Z(t_{ref})} = [a_x, a_y, a_z]^T,$$

$t_{ref}$ is located between the first moment and the second moment, $t_k$ represents a time stamp of the target event, $v=[v_x, v_y, v_z]$ represents a relative instantaneous speed of the target front vehicle at the host vehicle coordinate system at the reference moment $t_{ref}$, $v_x$, $v_y$, $v_z$ respectively represent the components in three directions of the xyz-axis of the host vehicle coordinate system, $Z(t_{ref})$ represents the z-direction coordinate of the contour point of the target front vehicle at the reference moment $t_{ref}$;

S104, by an objective function $$a^\star = \operatorname*{argmin}_{a} \sum_{e_k \in \varepsilon} \mathcal{T}_{ref}(W(p_k, t_k, t_{ref}; a))^2,$$

determining an optimal a, determining an optimal $a_z$ according to the optimal a, acquiring a reciprocal of the optimal $a_z$ to obtain a time-to-collision $ttc_{ref}$ of the host vehicle with the target front vehicle at the reference moment $t_{ref}$, calculating the time-to-collision of the current host vehicle with the target front vehicle $ttc_d=ttc_{ref}-(t_d-t_{ref})$, wherein $W(p_k, t_k, t_{ref}; a) \doteq \mathcal{A}(p_k; a)(t_{ref}-t_k)$, a function $\mathcal{T}_{ref}(\ )$ is used to calculate, for each target contour point, a time difference between the reference moment $t_{ref}$ and a time stamp of an event triggered by the target contour point closest to the reference moment $t_{ref}$, $e_k$ represents the target event, $\varepsilon$ represents the set of target events, and $t_d$ represents the current moment.

As a second aspect of the disclosure, there is provided an electronic device including a memory module including instructions loaded and executed by a processor that when executed cause the processor to perform the event camera-based time-to-collision estimation method of the above first aspect above.

As a third aspect of the present disclosure, there is provided a computer-readable storage medium storing one or more programs which, when executed by a processor, implement the event camera-based time-to-collision estimation method of the above first aspect.

The present disclosure estimates the time-to-collision based on a stream of events acquired by an event camera, overcomes the problem of very large delays in the prior art, and improves the time-to-collision estimation accuracy rate and robustness in autonomous driving scenarios, while the feature of low energy consumption enables the method to be better adapted to embedded scenarios, reducing procurement and running costs, the TTC output frequency of the method of the embodiment can be up to 200 Hz, so the method has great application potential in real-time TTC tasks, and is more suitable for real-time TTC tasks with sudden change in relative speed.

BRIEF DESCRIPTION OF DRAWINGS

The present disclosure will now be described in detail with reference to the accompanying drawings and specific embodiments.

DETAILED DESCRIPTION OF THE INVENTION

In Embodiments of the present disclosure will now be described with reference to the accompanying drawings. It should be noted that the embodiments referred to in this description are not exhaustive and do not represent the only embodiments of the disclosure. The following respective examples are only for the purpose of clearly illustrating the inventive content of the present disclosure and are not intended to limit the embodiments thereof. It will be apparent to those skilled in the art that various changes and modifications may be made to the embodiments described herein, and it is intended that the technical idea and the inventive concept are included in the present disclosure, and that obvious changes or modifications are within the scope of the present disclosure.

Figure 1:
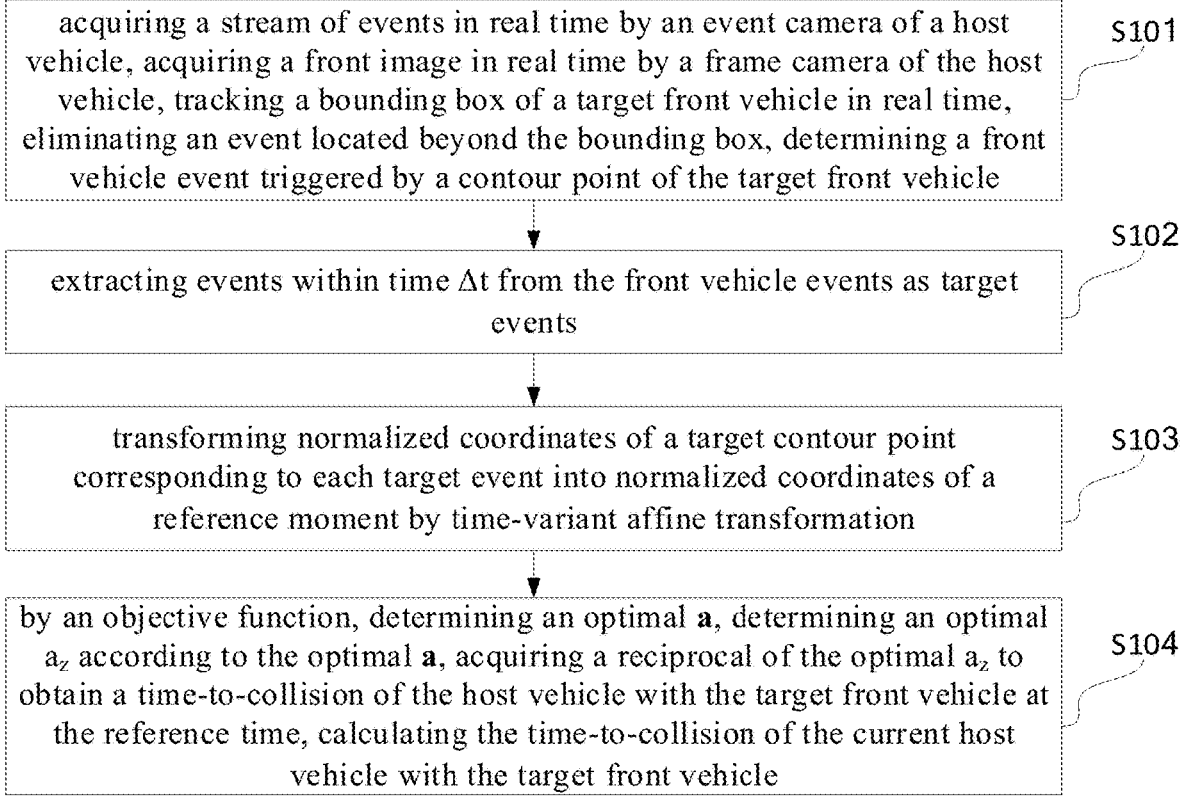
FIG. 1 is a flowchart illustrating an event camera-based time-to-collision estimation method according to an embodiment of the present disclosure.
Figure 2:
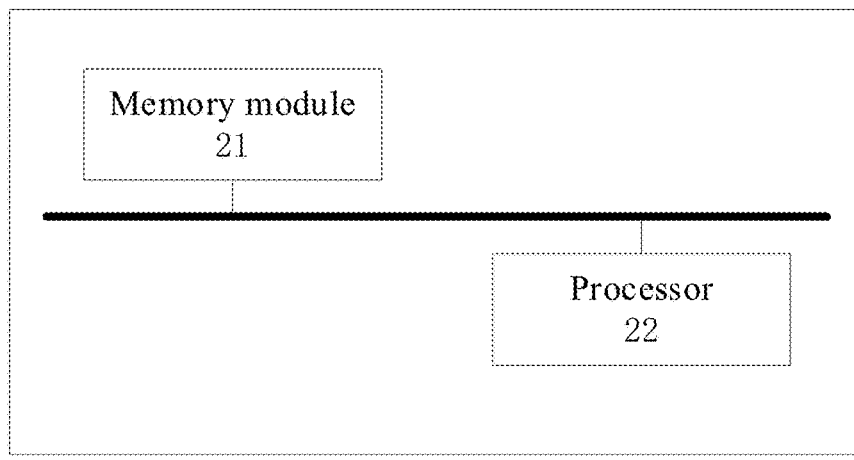
FIG. 2 is a schematic diagram of an electronic device according to an embodiment of the disclosure.

As shown in FIG. 1, an embodiment of the present disclosure provides an event camera-based time-to-collision estimation method and the specific flow is as follows:

S101, a stream of events is acquired in real time by an event camera of a host vehicle, a front image is acquired in real time by a frame camera of the host vehicle, a bounding box of a target front vehicle is tracked in real time, events located beyond the bounding box are eliminated, and a front vehicle event triggered by a contour point of the target front vehicle is determined.

Wherein, the event camera has the characteristics of low latency, high dynamic range, very low power consumption compared to the conventional frame camera, and outputs a change in luminance of a pixel, and outputs an event when the luminance change of a pixel accumulates to a threshold value. An event has three elements: a time stamp, pixel coordinates and polarity (lightening or darkening). When the luminance of a large number of pixels changes in a scenario caused by object motion or illumination changes, a series of events are generated, which are output in a stream of events.

In this embodiment, the target front vehicle in the front image is identified by YOLOv5, and tracked by a DeepSort algorithm, thereby achieving tracking of the bounding box of the target front vehicle.

S102, a stream of events within time $\Delta t$ are extracted from the front vehicle events as target events.

Wherein the $\Delta t$ is the difference between a first moment and a second moment, the first moment representing a current moment and the second moment being earlier than the first moment. $\Delta t$ may initially be a preset value, such as 0.1 seconds, and $\Delta t$ is dynamically determined when the number of front vehicle events satisfies a preset number, and $\Delta t$ is adjusted to 0.08 seconds if the number of front vehicle events within the front 0.08 seconds has satisfied the preset number.

In this embodiment, the target event is represented by the LTS image, i.e., the target events are rendered into the LTS image, and the pixel values of the pixel points of the LTS image are determined by the following equation:

$$\mathcal{T}(x, t_{ref}) = \begin{cases} t_k - t_{ref}, k = \underset{i \, for \, e_i \in \varepsilon_x}{\operatorname{argmin}} |t_i - t_{ref}| & \text{if } \varepsilon_x \neq \emptyset \\ 0 & \text{otherwise} \end{cases} \quad (1)$$

wherein, x represents the coordinates of the pixel point, i.e., the normalized coordinates of the target contour point to which the target event corresponds, $\varepsilon_x$ represents the set of events triggered by the pixel point, and $t_i$ represents the triggering time of an event $e_i$ in $\varepsilon_x$, $t_{ref}$ represents the reference moment, which is located between the first moment and the second moment, in the embodiment, the reference moment $t_{ref}$ is taken as an intermediate value of the first moment and the second moment.

Unlike the image-like representation using event data in a Time Surface (TS), we propose a Linear Time Surface (LTS). Unlike the ordinary time surface representation, the LTS image stores the time difference between the reference moment $t_{ref}$ and a time stamp of a triggered event closest to the reference moment $t_{ref}$, that is, the above equation (1) can be understood as calculating, for each pixel point, a time difference between the reference moment $t_{ref}$ and a time stamp of an event triggered by the pixel point closest to the reference moment $t_{ref}$, and then taking the time difference as the pixel value of the pixel point.

The LTS proposed here, on the one hand, also carries the properties of the distance field in a sense similar to the TS, which enables us to efficiently establish the association of event contours, and on the other hand, the LTS enhances the continuity of the distance field gradients in a different way. Unlike the TS, the LTS simply sets the reference moment $t_{ref}$ to the median time stamp of all relevant events, whereas the TS uses a smoothing kernel to circumvent the single-sided truncation of the TS gradient. Such a design brings two benefits, firstly, there is no shift in the true position of the contour points at the reference moment $t_{ref}$ and therefore no deviation in the registration result, and secondly, the resulting distance is transformed to become a signed function, which will result in a more accurate registration result.

Although most background events outside the bounding box of the target front vehicle have been eliminated in S101, to further combat noise and outliers, the pixel points of the LTS image are filtered as follows:

(i) a first-order gradient magnitude and a second-order gradient magnitude are determined for each point in the LTS image.

(ii) if the first-order gradient magnitude of the same point is greater than a preset first threshold value, and the second-order gradient magnitude is less than a preset second threshold value, the point is reserved as an effective point, wherein the first threshold value is greater than or equal to 0.0001, and is less than or equal to 0.1, and the second threshold value is greater than or equal to 0.00000001, and is less than or equal to 0.0001. Exemplarily, the first threshold value and the second threshold value are 0.0001 and 0.000001, respectively.

S103, normalized coordinates of a target contour point corresponding to each target event are transformed into normalized coordinates of a reference moment $t_{ref}$ by time-variant affine transformation through $\mathcal{A}(p_k; a)(t_{ref}-t_k)$, wherein, $$\mathcal{A}(p_k;a) = \frac{1}{Z(t_{ref})}\begin{bmatrix} -v_x + x(t_k)v_z \\ -v_y + y(t_k)v_z \end{bmatrix},$$

$p_k$ represents the normalized coordinates of the target contour point $$a \doteq \frac{v}{Z(t_{ref})} = [a_x, a_y, a_z]^T,$$

$t_k$ represents a time stamp of the target event, $v=[v_x, v_y, v_z]$ represents a relative instantaneous speed of the host vehicle compared with the target front vehicle at the reference moment $t_{ref}$, $v_x$, $v_y$, $v_z$ respectively represent the components of v in the xyz directions, $Z(t_{ref})$ represents the z-direction coordinate of the contour point of the target front vehicle at the reference moment $t_{ref}$.

The key to fitting a geometric model to an event when the relative distance changes, especially over a short period of time, is to employ an accurate model. Accordingly, embodiments of the present disclosure propose a time-variant affine model based on the true dynamics of contour points. The model is expressed in a continuous-time form, the relative instantaneous speed of the host vehicle compared with the front vehicle is $v=[v_x, v_y, v_z]$, the 3D contour point coordinates of the front vehicle in the scenario are $^BP=[X, Y, Z]$, $p=[x, y]^T=[X/Z, Y/Z]^T$ represents the image normalized coordinates of the 3D contour point $^BP$, and the optical flow u (which is the instantaneous speed of pixel motion of a spatially moving object on the viewing imaging plane) can be defined as the ordinary differential equation (ODE) of p, and the expression is as follows:

$$u(t) \doteq \dot{p}(t) = \begin{bmatrix} \dot{x}(t) \\ \dot{y}(t) \end{bmatrix} = \frac{1}{Z(t)}\begin{bmatrix} -v_x + x(t)v_z \\ -v_y + y(t)v_z \end{bmatrix} \quad (2)$$

Based on this expression, $t_0$ represents the starting time, the position of p at the reference moment $t_{ref}$ can be accurately obtained by integrating:

$$p(t_{ref}) = \int_{t_0}^{t_{ref}} u(t)dt + p(t_0) \quad (3)$$

By solving the ODE expression, the boundary condition ($t_{ref}$, $t_0$ integration interval) at $t_{ref}$ is substituted to obtain the general solution:

$$p(t_{ref}) = \underbrace{\frac{1}{Z(t_{ref})}\begin{bmatrix} -v_x + x(t_0)v_z \\ -v_y + y(t_0)v_z \end{bmatrix}}_{\mathcal{A}(p(t_0);v/Z(t_{ref}))}(t_{ref}-t_0) + p(t_0) \quad (4)$$

Wherein, $\mathcal{A}(p(t_0); v/Z(t_{ref}))$ is a time-variant affine model, can be regarded as an average optical flow over a time interval, used to precisely guide warping of events in the spatio-temporal domain, whereby, in S103, the normalized coordinates of the target contour points corresponding to the target event can be transformed into normalized coordinates of the reference moment $t_{ref}$ by time-variant affine transformation through $\mathcal{A}(p_k; a)(t_{ref}-t_k)+p_k$, here for simplicity of calculation, no $p_k$ is added for each target contour point; based on the above equation (3), $$\mathcal{A}(p_k;a) = \frac{1}{Z(t_{ref})}\begin{bmatrix} -v_x + x(t_k)v_z \\ -v_y + y(t_k)v_z \end{bmatrix}.$$

S104, by an objective function $$a^* = \arg\min_{a} \sum_{e_k \in \varepsilon} \mathcal{T}_{ref}(W(p_k, t_k, t_{ref}; a))^2$$

an optimal a is determined, an optimal $a_z$ is determined according to the optimal a, a reciprocal of the optimal $a_z$ is acquired to obtain a time-to-collision $ttc_{ref}$ of the host vehicle with the target front vehicle at the reference moment $t_{ref}$, wherein $W(p_k, t_k, t_{ref}; a)$ is a warping function, which can be approximated as $\mathcal{A}(p_k; a)(t_{ref}-t_k)$, i.e., $W(p_k, t_k, t_{ref}; a) \doteq \mathcal{A}(p_k; a)(t_{ref}-t_k)$, a function $\mathcal{T}_{ref}()$ is used to calculate, for each target contour point, a time difference between the reference moment $t_{ref}$ and a time stamp of an event triggered by the target contour point closest to the reference moment $t_{ref}$, $e_k$ represents the target event, $\varepsilon$ represents the set of target events, and $t_d$ represents the current moment.

It should be noted that if the optimal a is obtained, the optimal time-variant affine model is obtained, so that all involved events can be correctly mapped to the position of the reference moment $t_{ref}$, and spatio-temporal registration can be realized. The reciprocal of a is $Z(t_{ref})/v_z$, that is, the distance between the host vehicle and the front vehicle at the reference moment $t_{ref}$ is divided by the relative instantaneous speed in the z direction of the two, and the result obtained is the collision time $ttc_{ref}$ between the host vehicle and the target front vehicle at the reference moment $t_{ref}$.

In order to determine the optimal a more efficiently, the embodiment of the disclosure provides a high-quality initial value a for the objective function, and obtains the optimal a according to the initial value a. The specific process is as follows:

(1) Three effective points are chosen from the LTS image, normal flow vectors of the three effective points are calculated, respectively, according to gradients of the three effective points, it needs to be pointed out that calculating normal flow vectors of pixel points according to gradients is a well-known technique, which will not be specifically repeated here.

(2) To overcome the limitations of normal flow, we propose a more efficient geometric metric approach: the inner product of the full flow vector and the normal flow vector is equal to the squared norm of the normal flow vector.

Since a has three directional components, that is, three unknowns, it is necessary to substitute the normal flow vectors of the three effective points into the following equation respectively, and determine the initial value of a by an RANSAC method:

$$\begin{bmatrix} n_{k,x} \\ n_{k,y} \\ (\delta t_k n_k - p_k)^T n_k \end{bmatrix}^T \begin{bmatrix} a_x \\ a_y \\ a_z \end{bmatrix} = -n_k^T n_k \quad (5)$$

wherein, $n_k$ represents the normal flow vector, $n_{k,x}$ and $n_{k,y}$ represent the components in x and y directions of $n_k$, respectively, and $\delta t_k$ is the pixel value of the target point.

Taking the event triggered by the pixel point position $p_k$ and time $t_k$ as an example, its full flow vector is calculated with an equation (6):

$$p(t_{ref}) - p(t_0) = \frac{1}{z(t_0)} \begin{bmatrix} -v_x + x(t_0)v_z \\ -v_y + y(t_0)v_z \end{bmatrix} (t_{ref} - t_0) \quad (6)$$

The metric method described above is expressed by an equation (7) as:

$$\frac{1}{Z_k} \begin{bmatrix} -v_x + x_k v_z \\ -v_y + y_k v_z \end{bmatrix}^T n_k = n_k^T n_k \quad (7)$$

wherein, $n = [n_x, n_y]^T$ represents the normal flow of the event optical flow, the linear state vector can be directly established by substituting $$\frac{1}{Z_k} \text{ with } \frac{Z(t_{ref})}{Z(t_{ref})Z(t_k)}$$

in the equation 7, i.e., the above equation (5).

(3) After each determination of the optimal a, whether the difference between the first moment of $\Delta t$ of this time and the first moment of $\Delta t$ of the last time is greater than $\Delta t$ of the last time is judged, and if so, steps (1) and (2) are re-executed to calculate the initial value a, otherwise, when the optimal a is determined next time, the optimal a last time is taken as the initial value.

It should be noted that in the practical application of step 101, limited to the frame rate of the frame camera, it cannot be satisfied in the algorithmic tracking manner that the bounding box of the target front vehicle can be acquired at any time, so it is necessary to predict one front vehicle bounding box:

at the current moment, calculation is performed according to a first to last bounding box and a second to last bounding box of the target front vehicle tracked in real time to obtain a full flow (expansion rates of the bounding box on x and y axis are calculated according to the two bounding boxes respectively to obtain the full flow), a time interval $\Delta t_1$ between the current moment and the moment where the first last bounding box is located is calculated, the full flow is multiplied by $\Delta t_1$, then a size of the first last bounding box is added, and finally a preset coefficient is multiplied to obtain a predicted size of a front vehicle bounding box, i.e., the coordinates of the predicted front vehicle object box are obtained (it is assumed that the center coordinates of the front vehicle object box are unchanged).

Wherein, the predicted front vehicle bounding box may become larger or smaller relative to the last bounding box, but to better get the event triggered by the front vehicle contour, the preset coefficient is set to 120%.

The embodiments of the disclosure provide a method for estimating the time-to-collision based on the stream of events captured by the event camera, which overcomes the problem of very large delays in the prior art, and improve the time-to-collision estimation accuracy rate and robustness in autonomous driving scenarios, while the feature of low energy consumption enables the method to be better adapted to embedded scenarios, reducing procurement and running costs. The TTC output frequency of the method of the embodiment can be up to 200 Hz, so the method has great application potential in real-time TTC tasks, and is more suitable for real-time TTC tasks with sudden change in relative speed.

Same as the above concept, an embodiment of the present disclosure further provides a structural schematic block diagram of an electronic device.

Illustratively, the electronic device includes a memory module 21 and a processor 22, the memory module 21 including instructions loaded and executed by the processor 22 which, when executed, cause the processor 22 to perform steps according to various exemplary embodiments of the present disclosure that are described in the above-mentioned section of the description of the event camera-based time-to-collision estimation method.

It should be understood that the processor 22 may be a Central Processing Unit (CPU), which may also be other general-purpose processors, a Digital Signal Processor (DSP), an Application Specific Integrated Circuit (ASIC), a Field-Programmable GateArray (FPGA) or other programmable logic devices, discrete gates or transistor logic devices, discrete hardware components, or the like. Wherein, the general-purpose processor may be a microprocessor or the processor may be any conventional processor or the like.

Also provided in an embodiment of the present disclosure is a computer-readable storage medium storing one or more programs that, when executed by a processor, implement the steps according to various exemplary embodiments of the present disclosure that are described in the above-mentioned section of the description of the event camera-based time-to-collision estimation method.

It will be appreciated by those of ordinary skill in the art that all or some of the steps in the method, system, functional modules/units in the device disclosed above may be implemented as software, firmware, hardware, and appropriate combinations thereof. In a hardware implementation, the division between the functional modules/units referred to in the above description does not necessarily correspond to the division of physical components; for example, one physical component may have multiple functions, or one function or step may be performed by several physical components in cooperation. Some or all of the physical components may be implemented as software executed by a processor, such as a central processing unit, a digital signal processor or a microprocessor, or as hardware, or as an integrated circuit, such as an application specific integrated circuit. Such software may be distributed on computer readable storage media, which may include computer readable storage media (or non-transitory media) and communication media (or transitory media).

As is well known to those of ordinary skill in the art, the term computer-readable storage media includes volatile and nonvolatile, removable and non-removable media implemented in any method or technology for storage of information such as computer-readable instructions, data structures, program modules or other data. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to those of ordinary skill in the art that communication media typically include computer-readable instructions, data structures, program modules, or other data in a modulated data signal such as a carrier wave or other transport mechanism and can include any information delivery media.

Exemplarily, the computer readable storage medium may be an internal storage unit of the electronic device of the aforementioned embodiment, such as a hard disk or a memory of the electronic device. The computer readable storage medium may also be an external storage device of the electronic device, such as a plug-in hard disk, a Smart Media Card (SMC), a Secure Digital (SD) card, a Flash Card, etc., provided on the electronic device.

The electronic device and the computer-readable storage medium provided by the aforementioned embodiments estimate the time-to-collision based on a stream of events captured by an event camera, overcome the problem of very large delays in the prior art, and improve the time-to-collision estimation accuracy rate and robustness in autonomous driving scenarios, while the feature of low energy consumption enables the method to be better adapted to embedded scenarios, reducing procurement and running costs, the TTC output frequency of the method of the embodiment can be up to 200 Hz, so the method has great application potential in real-time TTC tasks, and is more suitable for real-time TTC tasks with sudden change in relative speed.

It will be apparent to those skilled in the art that various modifications and variations can be made to the present disclosure without departing from the scope thereof. Thus, to the extent that these modifications and variations of this application fall within the scope of the claims in this application and their equivalent techniques, this application is intended to include these modifications and variations as well.

What is claimed is:

1. An event camera-based time-to-collision estimation method, comprising:
    S101, acquiring a stream of events in real time by an event camera of a host vehicle, acquiring a front image in real time by a frame camera of the host vehicle, tracking a bounding box of a target front vehicle in real time, eliminating events located beyond the bounding box, determining a front vehicle event triggered by a contour point of the target front vehicle;
    S102, extracting events within time $\Delta t$ from the front vehicle events as target events, the $\Delta t$ being the difference between a first moment and a second moment, the first moment representing a current moment and the second moment being earlier than the first moment;
    S103, transforming normalized coordinates of a target contour point corresponding to each target event into normalized coordinates of a reference moment $t_{ref}$ by time-variant affine transformation through $\mathcal{A}(p_k; a)(t_{ref}-t_k)$, wherein, $$\mathcal{A}(p_k; a) = \frac{1}{Z(t_{ref})}\begin{bmatrix} -v_x + x(t_k)v_z \\ -v_y + y(t_k)v_z \end{bmatrix},$$

$p_k$ represents the normalized coordinates of the target contour point, $$a \coloneqq \frac{v}{Z(t_{ref})} = [a_x, a_y, a_z]^T,$$

$t_{ref}$ is located between the first moment and the second moment, $t_k$ represents a time stamp of the target event, $v=[v_x, v_y, v_z]$ represents a relative instantaneous speed of the target front vehicle at the host vehicle coordinate system at the reference moment $t_{ref}$, $v_x$, $v_y$, $v_z$ respectively represent the components in three directions of the xyz-axis of the host vehicle coordinate system, $Z(t_{ref})$ represents the z-direction coordinate of the contour point of the target front vehicle at the reference moment $t_{ref}$, and
    S104, by an objective function $$a^\star = \arg\min_a \sum_{e_k \in \varepsilon} \mathcal{T}_{ref}(W(p_k, t_k, t_{ref}; a))^2,$$

determining an optimal a, determining an optimal $a_z$ according to the optimal a, acquiring a reciprocal of the optimal $a_z$ to obtain a time-to-collision $ttc_{ref}$ of the host vehicle with the target front vehicle at the reference moment $t_{ref}$, calculating the time-to-collision of the current host vehicle with the target front vehicle $ttc_d=ttc_{ref}-(t_d-t_{ref})$, wherein $W(p_k, t_k, t_{ref}; a) \coloneqq \mathcal{A}(p_k; a)(t_{ref}-t_k)$, a function $\tau_{ref}()$ is used to calculate, for each target contour point, a time difference between the reference moment $t_{ref}$ and a time stamp of an event triggered by the target contour point closest to the reference moment $t_{ref}$, ex represents the target event, $\varepsilon$ represents the set of target events, and $t_d$ represents the current moment.

2. The event camera-based time-to-collision estimation method according to claim 1, wherein tracking the bounding box of the target front vehicle in real time further comprises:
    detecting a bounding box of a target front vehicle in a front image in real time by a target detection model, and tracking the bounding box in real time by a target tracking algorithm.

3. The event camera-based time-to-collision estimation method according to claim 2, wherein tracking the bounding box of the target front vehicle in real time further comprises:
    at the current moment, calculating according to a first to last bounding box and a second to last bounding box of the target front vehicle tracked in real time to obtain a full flow, calculating a time interval $\Delta t_1$ between the current moment and the moment where the first last bounding box is located, multiplying the full flow by $\Delta t_1$, then adding a size of the first last bounding box, and finally multiplying by a preset coefficient to obtain a predicted size of a front vehicle bounding box.

4. The event camera-based time-to-collision estimation method according to claim 1, wherein the $\Delta t$ is initially a preset value, and the $\Delta t$ is dynamically determined when the number of front vehicle events satisfies a preset number.

5. The event camera-based time-to-collision estimation method according to claim 4, wherein the reference moment $t_{ref}$ is taken as an intermediate value of the first moment and the second moment.

6. The event camera-based time-to-collision estimation method according to claim 5, wherein extracting the events from the first moment to the second moment from the front vehicle events as target events further comprises:
    rendering the target events into an Long time surface (LTS) image, determining pixel values of pixel points of the LTS image by the following equation:

$$\mathcal{T}(x, t_{ref}) = \begin{cases} t_k - t_{ref}, k = \arg\min_{i\ for\ e_i \in \varepsilon_x} |t_i - t_{ref}| & \text{if } \varepsilon_x \neq \emptyset \\ 0 & \text{otherwise} \end{cases}$$

wherein, x represents the coordinates of the pixel point, $\varepsilon_x$ represents the set of events triggered by the pixel point, and $t_i$ represents the triggering time of an event $e_i$ in $\varepsilon_x$.

7. The event camera-based time-to-collision estimation method according to claim 6, wherein extracting the events from the first moment to the second moment from the front vehicle events as target events further comprises:
   determining a first-order gradient magnitude and a second-order gradient magnitude for each point in the LTS image; and
   if the first-order gradient magnitude of the same point is greater than a preset first threshold value, and the second-order gradient magnitude is less than a preset second threshold value, reserving the point as an effective point, wherein the first threshold value is greater than or equal to 0.0001, and is less than or equal to 0.1, and the second threshold value is greater than or equal to 0.00000001, and is less than or equal to 0.0001.

8. The event camera-based time-to-collision estimation method according to claim 7, further comprising:
   (1) choosing three effective points from the LTS image, calculating normal flow vectors of the three effective points respectively according to gradients of the three effective points;
   (2) substituting the normal flow vectors of the three effective points into the following formula, respectively, determining an initial value of a by an Random Sample Consensus (RANSAC) method:

$$\begin{bmatrix} n_{k,x} \\ n_{k,y} \\ (\delta t_k n_k - p_k)^T n_k \end{bmatrix}^T \begin{bmatrix} a_x \\ a_y \\ a_z \end{bmatrix} = -n_k^T n_k$$

wherein, $n_k$ represents the normal flow vector, $n_{k,x}$ and $n_{k,y}$ represent the components in x and y directions of $n_k$, respectively, and $\delta t_k$ is the pixel value of the target point; and
   (3) after each determination of the optimal a, judging whether the difference between the first moment of $\Delta t$ of this time and the first moment of $\Delta t$ of the last time is greater than $\Delta t$ of the last time, and if so, re-executing steps (1) and (2) to calculate the initial value a, otherwise, when the optimal a is determined next time, taking the optimal a last time as the initial value.

9. An electronic device, comprising a memory module comprising instructions loaded and executed by a processor that when executed cause the processor to perform the event camera-based time-to-collision estimation method according to claim 1.

* * * * *